(12) United States Patent
Dinh

(10) Patent No.: US 10,367,338 B2
(45) Date of Patent: Jul. 30, 2019

(54) WIRE COMPRESSION CONNECTOR

(71) Applicant: Thomas & Betts International, LLC, Wilmington, DE (US)

(72) Inventor: Cong Thanh Dinh, Collierville, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 15/452,773

(22) Filed: Mar. 8, 2017

(65) Prior Publication Data

US 2017/0179694 A1    Jun. 22, 2017

Related U.S. Application Data

(62) Division of application No. 14/212,626, filed on Mar. 14, 2014, now Pat. No. 9,673,537.

(60) Provisional application No. 61/790,742, filed on Mar. 15, 2013.

(51) Int. Cl.
*H02G 1/00* (2006.01)
*H02G 1/14* (2006.01)
*H01R 4/20* (2006.01)

(52) U.S. Cl.
CPC ............. *H02G 1/14* (2013.01); *H01R 4/20* (2013.01)

(58) Field of Classification Search
CPC ...... H01R 9/05; H01R 9/0506; H01R 13/512; H01R 13/59; H01R 4/00; H01R 4/021; H01R 4/023; H01R 4/66; B60R 16/0207; H01B 7/0045; H01B 11/02; H01B 11/04; H01B 11/06; H01B 11/08; H01B 11/085; H01B 11/10; H01B 11/1008; H01B 11/1016; H01B 11/1025; H01B 11/1033; H01B 11/1041; H01B 11/105; H01B 11/1058; H01B 11/1075; H01B 11/1083; H01B 11/1091; H01B 11/1834; H02G 15/08; H02G 3/0481; H02G 5/06; H02G 3/14; H02B 5/01

See application file for complete search history.

(56) References Cited

U.S. PATENT DOCUMENTS

| 3,009,987 | A * | 11/1961 | Brenner | ......... | H01R 4/186 174/71 R |
| 7,655,863 | B2 * | 2/2010 | Kossak | ......... | H01R 4/186 174/84 C |
| 7,754,968 | B2 * | 7/2010 | Fallstrom | ......... | H01R 4/183 174/84 C |
| 7,997,943 | B2 * | 8/2011 | Gregory | ......... | H01R 4/5091 439/782 |

(Continued)

*Primary Examiner* — Pete T Lee
(74) *Attorney, Agent, or Firm* — Taft Stettinius & Hollister LLP; J. Bruce Schelkopf

(57) ABSTRACT

A compression connector for connecting two wires is disclosed. The compression connector is made of either a single bifurcated connector body or two individual connector components that are slidably coupled and then crimped. As the compression connector is crimped, structural features on the connector components are pushed into a locked state in the two component embodiment. Bifurcated embodiments allow for more than one crimping act on the compression connectors resulting in a more reliable compression connection. The compression connector that results is much more resistant to failure compared to known C-shaped compression connectors.

10 Claims, 6 Drawing Sheets

(56) References Cited

U.S. PATENT DOCUMENTS 8,258,402 B2 * 9/2012 Hagi ................... H01R 4/726
                                                  174/84 C
9,190,741 B2 * 11/2015 Cawood ................ H01R 4/187

* cited by examiner

WIRE COMPRESSION CONNECTOR

CROSS-REFERENCES TO RELATED APPLICATIONS

This application is a Divisional of U.S. application Ser. No. 14/212,626, filed Mar. 14, 2014, now issued as U.S. patent Ser. No. 9,673,537, through which this application claims the benefit of U.S. Provisional Application No. 61/790,742, filed Mar. 15, 2013, both of which are incorporated herein by reference in their entirety.

FIELD OF THE INVENTION

The present invention is generally directed toward a compression connector for connecting wires.

BACKGROUND OF THE INVENTION

Compression connectors are used to connect wires together to ensure that an electric current will flow without interruption through the wires. The connectors also provide a mechanical connection that prevents the wires from being pulled apart. In the case of grounding wires, compression connectors can also be used to connect a grounding wire to a grounding rod. Compression connectors are typically installed through the use of a crimping tool that applies pressure to the outside of the compression connector causing it to deform around the wires.

Under circumstances of high voltage or mechanical tension on the wires, a standard C-tap connector will fail as it opens up from its crimped state. As a result, the wires may become disconnected, creating a potential hazard.

SUMMARY OF THE INVENTION

A compression connector is disclosed herein that can withstand greater pullout tensions compared to previous compression connectors. The compression connector consists of two connector components that are slidably coupled together around the wires to be crimped. When crimped, the compression connector deforms such that it locks in place and is resistant to failure. It should be appreciated that it is simple to manufacture, and can be used with existing crimping dies.

BRIEF DESCRIPTION OF THE DRAWINGS

Further advantages of the invention will become apparent by reference to the detailed description of preferred embodiments when considered in conjunction with the drawings.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1A:
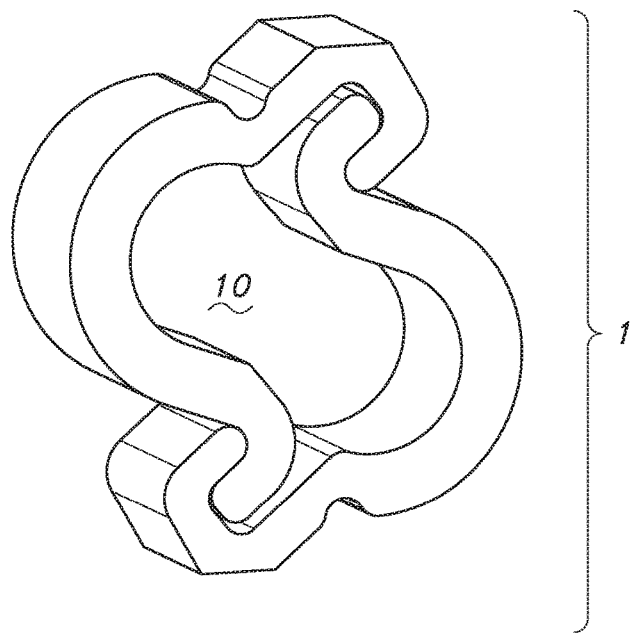
FIG. 1A is a perspective view of the disclosed compression connector.
Figures 1B, 1C:
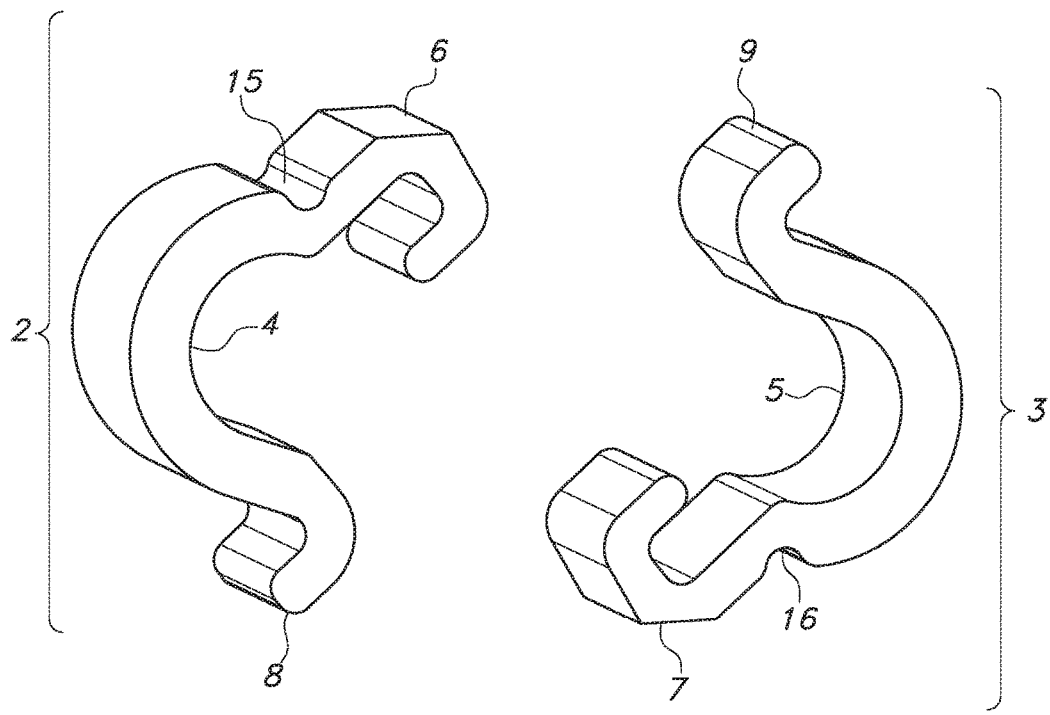
FIG. 1B is a perspective view of the first connector component.
FIG. 1C is a perspective view of the second connector component.

As will be appreciated from FIG. 1, compression connector 1, is comprised of two connector components: a first connector component 2 and a second connector component 3. Each of these connector components are configured to couple with each other, thus forming a wire opening 10 through which the wires to be connected are positioned. The connector components are each made of a single piece of an electrically conductive material, such as conductive metal, and generally have a similar appearance in shape and size. In some embodiments, the two connector components may actually be identical shapes, such as those shown in FIG. 1B and FIG. 1C, which, when coupled together, result in the embodiment shown in FIG. 1A.

Figure 2:
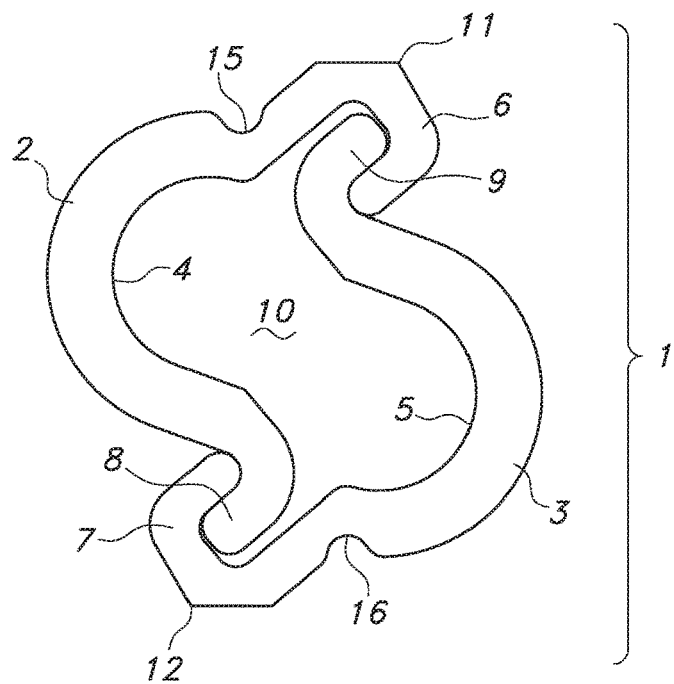
FIG. 2 is a front elevation view of the compression connector.

Each of the connector components has a concave area for receiving a wire, referred to herein as a wire cradle. Although the description refers to wires, it will be appreciated that the disclosed invention may also be applied to the connection of wires to grounding rods or other conductors. In a preferred embodiment, the wire cradle is a curved surface with a radius slightly larger than that of the wire it receives. As shown in FIG. 2, first connector component 2 has a first wire cradle 4 configured to receive a first wire, and second connector component 3 has a second wire cradle 5 configured to receive a second wire. When coupled together, first connector component 2 and second connector component 3 form wire opening 10 that contains the section of both wires to be crimped. In some embodiments, such as that depicted in FIG. 3, the two connector components are different sizes to accommodate differently sized wires.

Corresponding structures on each of the two connector components allow them to couple together. The structures form complementary shapes that allow one end of a connector component to fit within the opposite end of the other connector component.

In the embodiment shown in FIG. 2, at one end of first connector component 2 lies a first appendage 8 that is configured to nestle within second receiver 7 located on second connector component 3. At the other end of first connector component 2, across the first wire cradle 4, is first receiver 6 that is configured to receive second appendage 9 located on second connector component 3. First receiver 6 is a u-shaped structure having an internal cavity that can receive second appendage 9. Similarly, second receiver 7 is a u-shaped structure having an internal cavity that can receive first appendage 8.

In a preferred embodiment, first appendage 8 and second appendage 9 have identical shapes, and first receiver 6 and second receiver 7 have identical shapes. The shape of the appendages is simply a portion of the connector component that extends away from the wire cradle. However, it is anticipated that the appendage could have any shape that fits within the interior cavity of the receiver.

Figure 4:
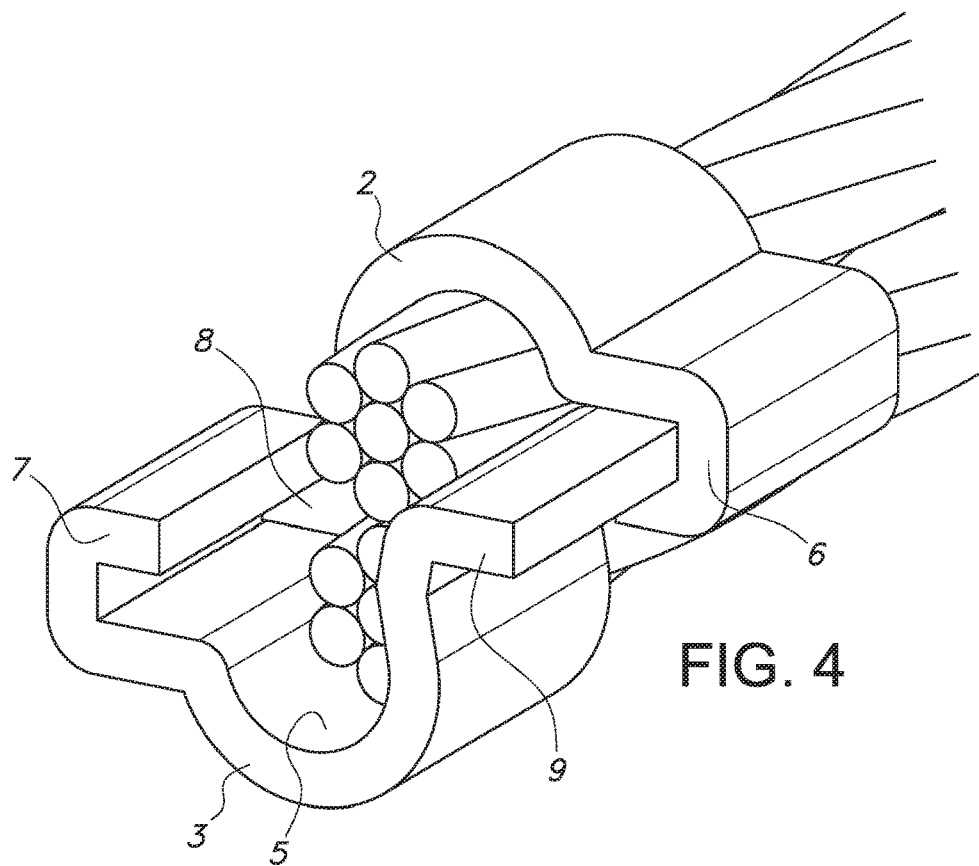
FIG. 4 depicts a compression connector component being installed onto wires.

To couple the first connector component 2 to the second connector component 3, the first connector component 2 is placed alongside second connector component 3 such that first appendage 8 is aligned with the second receiver 7, and the second appendage 9 is aligned with first receiver 6, as shown in FIG. 4. Once aligned, the first connector component 2 can slide into second connector component 3, thus coupling them together. It should be appreciated that the coupling of the first connector component 2 and second connector component 3 can be performed before or after positioning the wires within their respective wire cradles.

Figure 5:
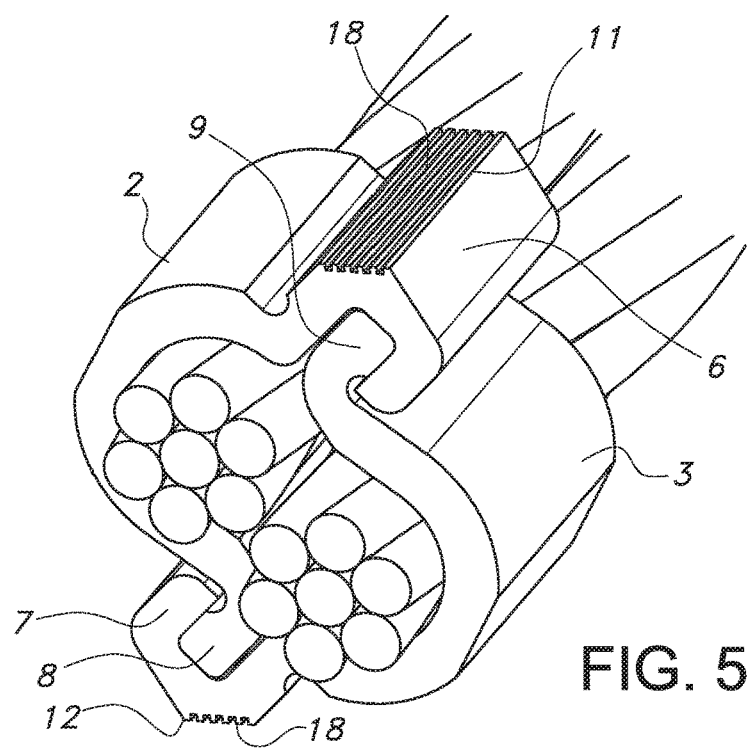
FIG. 5 depicts a compression connector component as installed onto wires prior to crimping.

In the coupled state with wires positioned in the wire opening 10, as depicted in FIG. 5, compression connector 1 is ready to be crimped. Structural features of the compression connector 1 will make crimping easier, and will result in a stronger attachment compared to prior known compression connectors.

Figure 6:
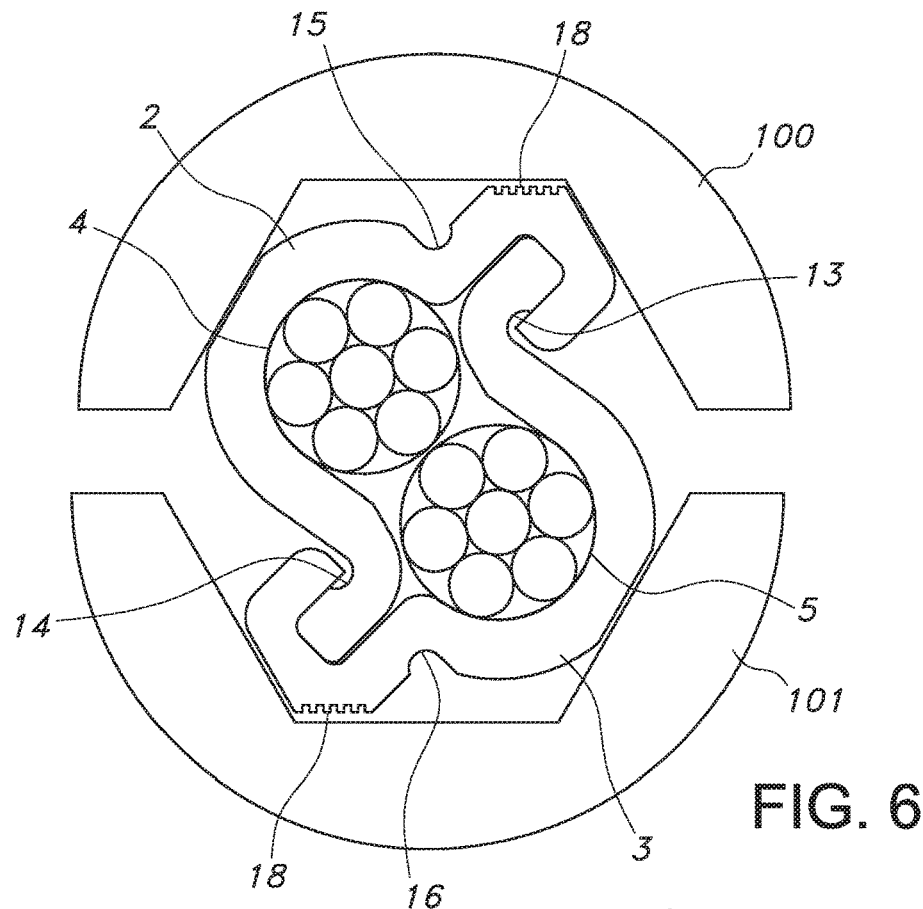
FIG. 6 depicts a front elevation view of the compression connector as installed onto wires and placed into a crimper prior to crimping.
Figure 7:
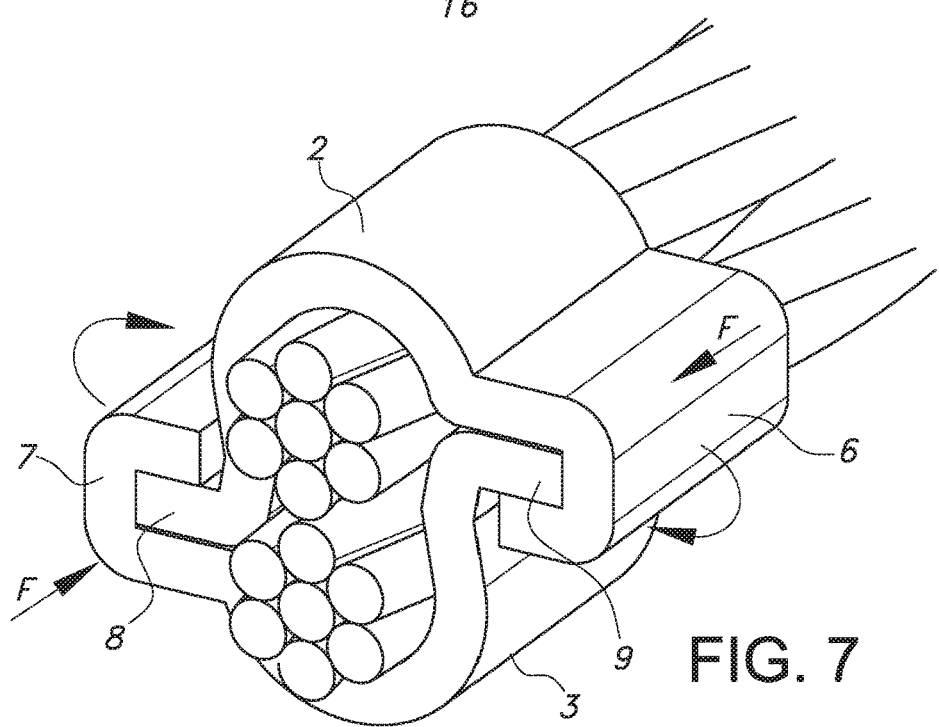
FIG. 7 depicts the forces applied to the receivers of the compression connector and resultant deformation that will occur.
Figure 8:
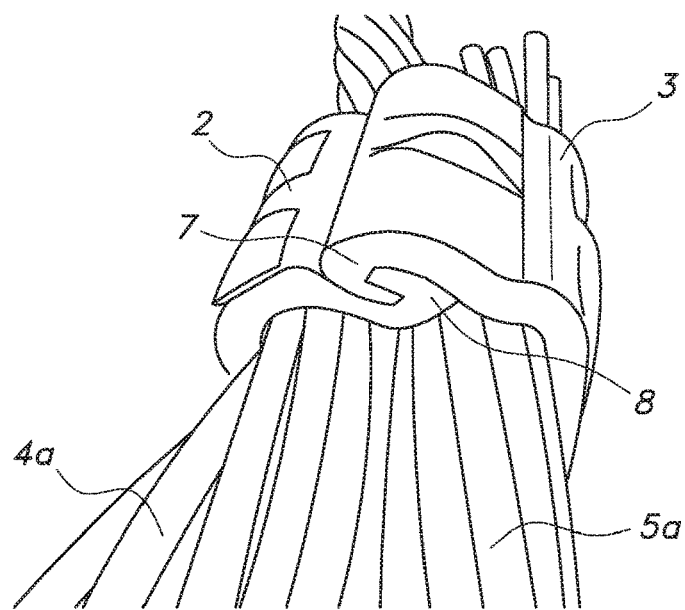
FIG. 8 is a shows a compression connector on wires after crimping.

As will be appreciated from FIG. 6, the compression connector 1 is affixed to the wires by using a crimper. The compression connector 1 is designed to fit into existing crimping dies that are currently in use for crimping wires and lugs, and does not require any special equipment. The compression connector 1 is designed such that, as it is compressed by the crimping die, it will deform in a specific manner such that each receiver locks its appendage within it in place. FIG. 7 depicts the forces that are applied to the first receiver 6 and second receiver 7. The crimper forces the first receiver 6 and the second appendage 9 to bend toward the second wire cradle 5, locking the second appendage 9 in place. The crimper also forces the second receiver 7, as well as the first appendage 8, within it to bend toward the first wire cradle 4, locking the first appendage 8 in place. FIG. 8 depicts a compression connector 1 in a deformed state with wires 4a and 5a after crimping. In this deformed state, neither appendage can easily slide out and past the collapsed receiver to allow the compression connector 1 to open, as can be appreciated in FIG. 8 by the folding of first appendage 8 and second receiver 7.

Structural features of the compression connector 1 ensure that the compression connector 1 deforms in a prescribed manner resulting in enhanced locking of the connector components in place. First, as seen in FIG. 6, the shape of compression connector 1 ensures that the force of the crimper will initially be applied directly to the receivers. Two outer surfaces of first receiver 6 come together at first receiver edge 11 that has an angle that matches the inner angles of the crimp die. Similarly, two outer surfaces of second receiver 7 come together at second receiver edge 12 that has an angle that matches the inner angles of the crimp die. As a result, the compression connector 1 can be oriented in the crimp die as shown in FIG. 6 with one surface of the first receiver 6 receiving pressure from upper half crimp die 100 in a perpendicular direction, and one surface of the second receiver 7 receiving pressure from below from lower half crimp die 101 in a perpendicular direction. The surfaces may be textured 18 to aid in identification and to prevent slippage. As pressure is applied to first receiver 6 from the upper half crimp die 100, second connector component 3 will start to deform at second appendage divot 14. As pressure is applied to second receiver 7 from lower half crimp die 101, first connector component 2 will start to deform at first appendage divot 13.

The first connector component 2 may additionally have an indentation on its outer surface near the first receiver 6 to ensure that the first connector component 2 will bend at the proper location. This first receiver indentation 15 serves as a flex point as the whole first receiver 6 is pushed by the upper half crimp die 100. Likewise, second connector component 3 may additionally have an indentation on its outer surface near the second receiver 7 to ensure that the second connector component 3 will bend at the proper location. This second receiver indentation 16 serves as a flex point as the whole second receiver 7 is pushed by the lower half crimp die 101.

The deformed shape of the compression connector 1 provides much greater resistance to failure compared to standard C-shaped compression connectors. Typically, these C-shaped connectors fail by opening up at their entrance point. However, the currently disclosed compression connector 1 does not easily open up due to the deformation of the appendage and receiver. Pull tests indicate that the claimed device can withstand at least three times the force that C-taps can.

Figure 9:
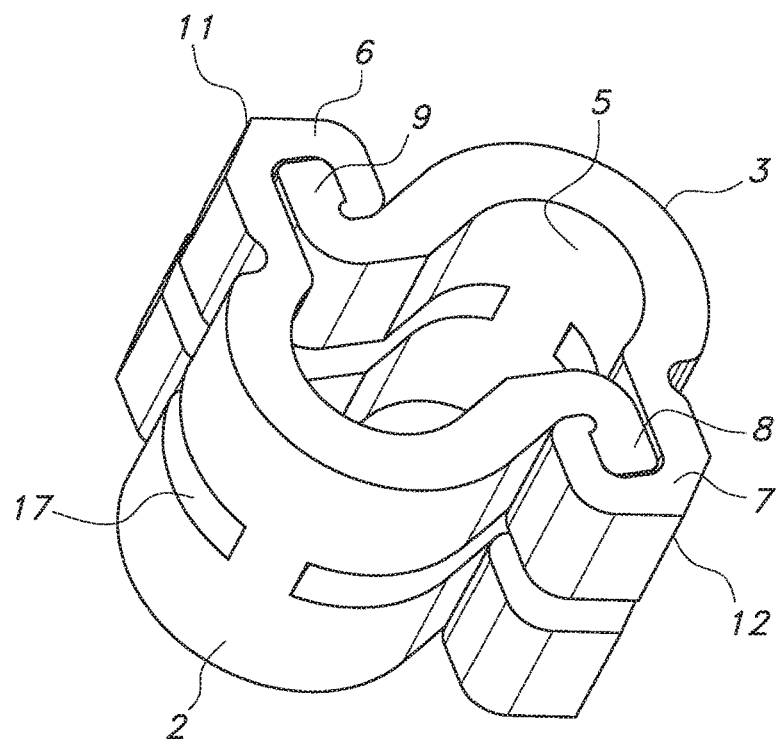
FIG. 9 depicts a slotted embodiment of the compression connector.

In circumstances where it is desired to have an even greater mechanical strength and resistance to failure, a slotted embodiment may be used, as shown in FIG. 9. This embodiment operates similarly to the embodiments described above, however, each of the two connector components are partially separated along their length, forming a slot 17 running down the middle. Due to the partial separation, the compression connector 1 may be crimped twice on either side of the slot 17. Each of these crimps will act independently to hold the wires firmly together, thus greatly increasing the resistance to failure of the compression connector 1. The slot 17 additionally provides a location through which a plastic tie may be used to hold the compression connector 1 in place. This may be particularly useful where the wires are oriented vertically, and the connector components are sliding off of each other prior to crimping.

Figure 3:
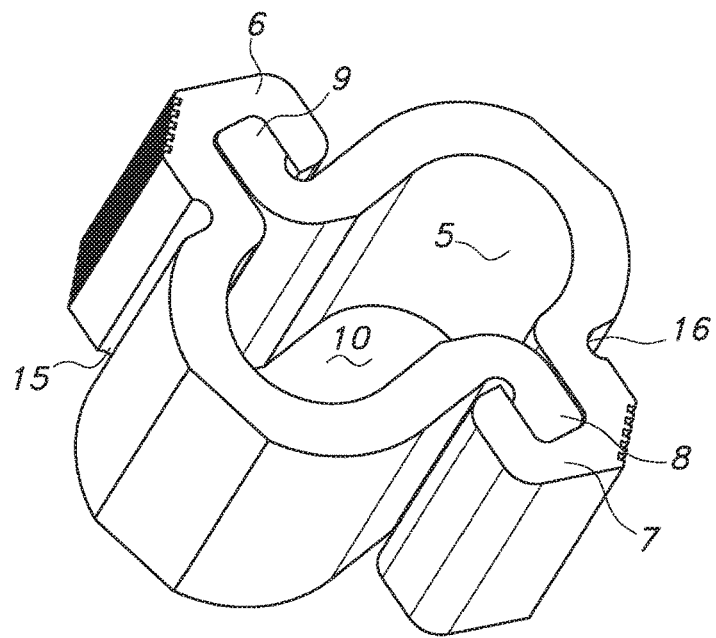
FIG. 3 is a perspective view of an embodiment of the compression connector where the first connector component has a wire cradle for a smaller wire than the wire cradle of the second connector component.

The disclosed invention provides several advantages over other compression connectors. First, as previously stated, the compression connector 1 has been shown to be more resistant to failure due to the locked state of the receiver and appendage once crimped. Unlike standard C-tap connectors, there is no opening which provides a location for failure. Instead, the wires are fully surrounded by the compression connector 1. Also, a tighter connection can be made through the use of appropriately sized connector components. As depicted in FIG. 3, in circumstances where the wires have different sizes, a connector component having a smaller wire cradle may be used on the smaller wire. This allows the installer to combine various connector components to match the characteristics of the wire and provide a customized connector that will bind the wires more tightly. Finally, it should be appreciated that no special crimping dies are required. The installer can use existing dies to achieve the much stronger connection.

Referring now to FIGS. 10A-D, a single piece embodiment of the compression connector 20 of the present invention is shown. As will be appreciated from FIG. 10A and FIG. 10B, compression connector 20, is comprised of a single (one) connector body 21. The connector body 21 has a first terminal end 22 and a second terminal end 23. The connector body 21 further has an outer surface 24 and an inner surface 25. The compression connector 20 has a single wire or conductor opening 26 formed between the terminal ends 22 and 23. It is anticipated that compression connector 20 could be configured to have more than one inner surface 25 and outer surface 24, e.g., in an "S" shape, such that two wire openings are formed, and such configurations are within the scope of the present invention. The connector body 21 is made of a single piece of an electrically conductive material, such as conductive metal, and more particularly iron, an iron alloy, aluminum, an aluminum alloy, copper, or a copper alloy. In preferred embodiments, the connector body 21 is made of copper.

Figure 10A:
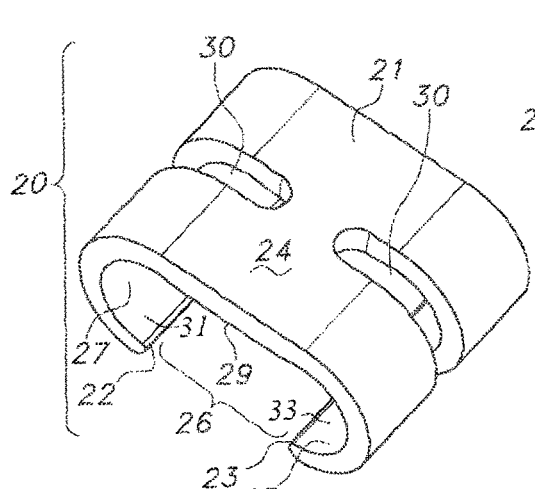
FIG. 10A is a perspective view from the outer surface side of a single-piece embodiment of the compression connector with slots.
Figure 10B:
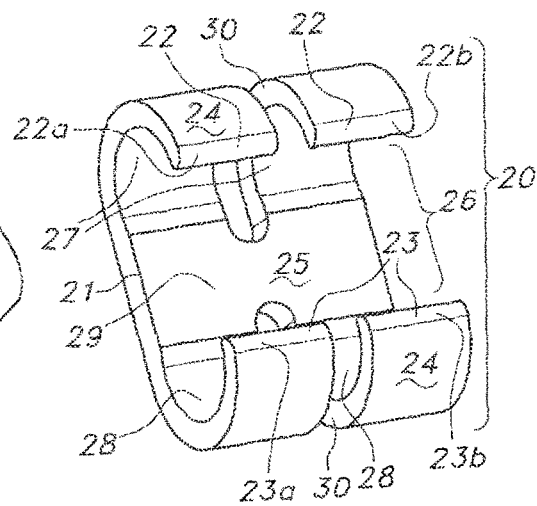
FIG. 10B is a perspective view from the inner surface side of a single-piece embodiment of the compression connector with slots.
Figure 10C:
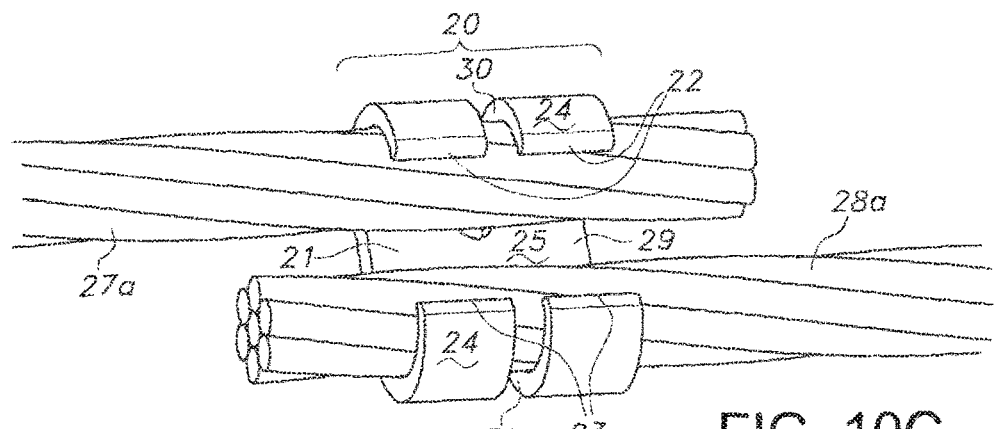
FIG. 10C depicts a single piece compression connector as installed onto wires prior to crimping.

The inner surface 25 at each of the terminal ends 22 and 23 has a concave area for receiving a wire, referred to herein as a wire cradle. Although the description refers to wires, it will be appreciated that the disclosed invention may also be applied to the connection of wires to grounding rods or other conductors. First wire cradle 27 is located at the inner surface 25 near first terminal end 22, and second wire cradle 28 is located at the inner surface 25 near second terminal end 23. The inner surface 25 also includes a ridge 29 separating first wire cradle 27 and second wire cradle 28. In a preferred embodiment, the wire cradles 27 and 28 are each a curved surface with a radius slightly larger than that of the wire it receives. As shown in FIG. 10C, connector body 21 has a first wire cradle 27 that provides an opening 31 (FIG. 10A) configured to receive a first wire 27a, and connector body 21 has a second wire cradle 28 that provides an opening 33 (FIG. 10A) configured to receive a second wire 28a. As stated above, the terminal ends 22 and 23 form wire opening 26 that will contain the sections of both wires 27a and 28a to be crimped. In some embodiments, not shown, the wire cradles 27 and 28 are different sizes to accommodate differently sized wires.

Figure 10D:
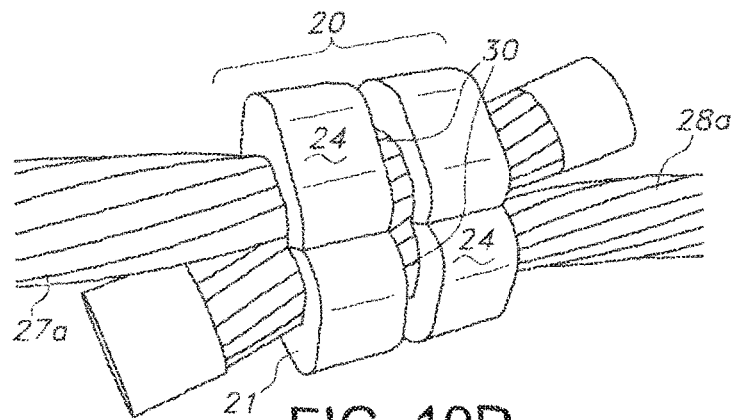
FIG. 10D depicts a single piece compression connector as installed onto wires after crimping.

Once wires 27a and 28a are positioned in the wire opening 26 and placed in corresponding wire cradles 27 and 28, as depicted in FIG. 10C, compression connector 20 is ready to be crimped using a crimper tool. The first terminal end 22 and the second terminal end 23 are configured to close the wire or conductor opening upon an act of compression, such as being crimped. The compression connector 20 is designed to fit into existing crimping dies that are currently in use for crimping wires and lugs, and does not require any special equipment. The compression connector 20 is designed such that, as it is compressed by the crimping die, it will deform in a specific manner such that the terminal ends 22 and 23 are compressed together, which closes wire opening 26. The surfaces may be textured to aid in identification and to prevent slippage. FIG. 10D depicts a compression connector 20 in a deformed state with wires 27a and 28a in wire cradles 27 and 28, respectively.

To provide greater mechanical strength and resistance to failure, compression connector 20 also contains slots 30. As can readily be seen in all panels of FIG. 10, connector body 21 of compression connector 20 is partially separated along its length, forming slots 30 running down the middle from each terminal end 22 and 23 to near ridge 29. Slots 30 create a separation at each terminal end 22 and 23, which is shown in FIG. 10B as first terminal ends 22a and 22b and second terminal ends 23a and 23b. Due to the partial separation or bifurcation of each end up to near ridge 29, the compression connector 20 may be crimped twice on either side of the slot 30, as shown in FIG. 10D. Each of these crimps will act independently to hold the wires firmly together, thus greatly increasing the resistance to failure of the compression connector 20. The slots 30 additionally provide a location through which a plastic tie may be used to hold the compression connector 20 in place. This may be particularly useful where the wires to be crimped are oriented vertically. This embodiment provides several advantages over other known compression connectors, particularly other C-tap connectors. A tighter connection can be made through the use of appropriately sized compression connectors 20, i.e., compression connectors with the wire cradles appropriately sized for the wires to be crimped. The compression connector 20 also has slots 30, which provide greater mechanical strength and resistance to failure. Finally, it should be appreciated that no special crimping dies are required. The installer can use existing dies to achieve the much stronger connection.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

I claim:

1. A compression connector comprising: a. a bifurcated connector body having a continuous inner surface and an outer surface; b. a first wire cradle and a second wire cradle, the first wire cradle having a first cradle opening sized and positioned to receive at least a first wire, the second wire cradle having a second cradle opening sized and positioned to receive at least a second wire; c. a first terminal end and a second terminal end, the first terminal end and the second terminal end being at opposing ends of the compression connector and positioned between the inner surface and the outer surface, a portion of the inner surface adjacent to the first terminal end defining at least a portion of the first wire cradle and another portion of inner surface adjacent to the second terminal end defining at least a portion of the second wire cradle, wherein the first terminal end comprises a first pair of terminal ends separated by a first slot, and wherein the second terminal end comprises a second pair of terminal ends separated by a second slot, wherein each terminal end of the first pair of terminal ends and the second pair of terminal ends are positioned and structured to, upon an act of compression of the compression connector, individually be displaced into direct abutment with an opposing terminal end of the first pair of terminal ends or the second pair of terminal ends close a conductor opening and constrict a size of both the first wire cradle and the second wire cradle such that the first wire in the first wire cradle and the second wire in the second wire cradle are displaced into direct contact with each other, and wherein the bifurcated connector body is structured for the first wire cradle opening to be in direct fluid communication with the second wire cradle opening both prior to and after the act of compression such that the first wire is in direct contact with the second wire after the act of compression, wherein the inner surface has a ridge having a width extending in a direction perpendicular to a lengthwise direction of the compression connector and the ridge is located between the first slot and the second slot: wherein each of the first slot and the second slot terminate adjacent to opposing sides of the ridge, respectively.

2. The compression connector of claim 1, wherein the first slot and the second slot facilitate two separate crimps of the bifurcated connector body on either side of the first slot and the second slot.

3. The compression connector of claim 1, wherein the bifurcated body is made of a conductive metal.

4. The compression connector of claim 3, wherein the conductive metal is copper.

5. A compression connector for connecting two conductors, the compression connector comprising: an inner surface and an outer surface: a first end, the inner surface at the first end defining a first cradle, the first cradle having a first cradle opening sized to receive at least a first connector, the first cradle terminating at a bifurcated first terminal end positioned between the inner surface and the outer surface, the bifurcated first terminal end comprising a plurality of first terminal ends, each of the plurality of first terminal ends being separated from an adjacent one of the plurality of first terminal ends by a first slot; and a second end, the first end and the second end being at opposing ends of the compression connector, the inner surface at the second end defining a second cradle, the second cradle having a second cradle opening sized to receive at least a second connector, the second cradle terminating at a bifurcated second terminal end positioned between the inner surface and the outer surface, the bifurcated second terminal end comprising a plurality of second terminal ends, each of the plurality of second terminal ends being separated from an adjacent one of the plurality of second terminal ends by a second slot, wherein each of the plurality of second terminal ends is in an opposing relationship relative to one of the plurality of first terminal ends such that each of the second terminal ends and the opposing first terminal end can each be crimped into direct contact with each other (1) independent of the crimping of the other terminal ends of the plurality of first and second terminal ends, and (2) in a manner that displaces an adjacent portion of the first or second connector within the respective first or second cradle opening to a posit ion at which the adjacent portion of the first or second connector is in direct contact with the other of the first and second connector, and wherein the first bifurcated terminal end and the second bifurcated terminal end define a portion of a connector opening that extends between, and is in communication with each of, the first cradle opening and the second cradle opening and wherein the inner surface has a ridge having a width extending in a direction perpendicular to a lengthwise direction of the compression connector and the ridge is located between the first slot and the second slot: wherein each of the first slot and the second slot terminate adjacent to opposing sides of the ridge, respectively.

6. The compression connector of claim 5, wherein the first slot and the second slot facilitate two separate crimps of the compression connector on either side of the first slot and the second slot.

7. The compression connector of claim 5, wherein the inner surface at the first wire cradle and the second wire cradle has a concave shape.

8. The compression connector of claim 5, wherein the first bifurcated terminal end and the second bifurcated terminal end are configured to close a conductor opening upon an act of compression.

9. The compression connector of claim 5, wherein the compression connector is made of a conductive metal.

10. The compression connector of claim 9, wherein the conductive metal is copper.

* * * * *